United States Patent
Salem et al.

(10) Patent No.: US 11,815,782 B2
(45) Date of Patent: Nov. 14, 2023

(54) MID-INFRARED BROADBAND LASER USING CASCADED NONLINEARITIES IN MID-INFRARED FIBER AND NONLINEAR CRYSTAL

(71) Applicant: Thorlabs, Inc., Newton, NJ (US)

(72) Inventors: Reza Salem, Columbia, MD (US); Peter Fendel, Sparta, NJ (US); Sterling Backus, Erie, CO (US); Dongfeng Liu, Columbia, MD (US); Chenchen Wan, Jessup, MD (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 17/672,390

(22) Filed: Feb. 15, 2022

(65) Prior Publication Data

US 2022/0260889 A1 Aug. 18, 2022

Related U.S. Application Data

(60) Provisional application No. 63/149,862, filed on Feb. 16, 2021.

(51) Int. Cl.
*G02F 1/35* (2006.01)
*G02F 1/355* (2006.01)
(Continued)

(52) U.S. Cl.
CPC .......... *G02F 1/3507* (2021.01); *G02F 1/3503* (2021.01); *G02F 1/3528* (2021.01);
(Continued)

(58) Field of Classification Search
CPC .... G02F 1/3503; G02F 1/3507; G02F 1/3528; G02F 1/3548; G02F 1/3551; G02F 1/365;
(Continued)

(56) References Cited

U.S. PATENT DOCUMENTS

| 6,885,683 B1* | 4/2005 | Fermann | ............... H01S 3/1112 372/6 |
|---|---|---|---|
| 9,213,215 B2* | 12/2015 | Shaw | .................... G02F 1/3532 |

(Continued)

FOREIGN PATENT DOCUMENTS

WO WO-2015105752 A1 * 7/2015 ........... G01N 21/255

OTHER PUBLICATIONS

Salem, R., et al., "Mid-infrared supercontinuum generation spanning 1.8 octaves using step-index indium flouride fiber pumped by a femtosecond fiber laser near 2 µm", Optics Express, Nov. 16, 2015, pp. 30592-30602, vol. 23, No. 24.
(Continued)

*Primary Examiner* — Daniel Petkovsek
(74) *Attorney, Agent, or Firm* — MYERS WOLIN, LLC

(57) ABSTRACT

A mid-infrared broadband laser including: a femtosecond laser configured to generate a near-infrared light; nonlinear waveguide configured to broaden and/or shift a spectrum of the light from the femtosecond laser; and a nonlinear medium configured to generate a broadband light by mixing spectral components of the output from the non-linear waveguide. Optionally, at least one dispersion compensation element may be placed between the femtosecond laser and the nonlinear waveguide and/or between the nonlinear waveguide and the nonlinear medium.

18 Claims, 1 Drawing Sheet

(51) Int. Cl.
*G02F 1/365* (2006.01)
*H01S 3/00* (2006.01)
*H01S 3/067* (2006.01)

(52) U.S. Cl.
CPC .......... *G02F 1/3548* (2021.01); *G02F 1/3551* (2013.01); *G02F 1/365* (2013.01); *H01S 3/0092* (2013.01); *H01S 3/06716* (2013.01); *G02F 2203/11* (2013.01)

(58) Field of Classification Search
CPC . G02F 2203/11; H01S 3/0092; H01S 3/06716
See application file for complete search history.

(56) References Cited

U.S. PATENT DOCUMENTS

| | | | | |
|---|---|---|---|---|
| 11,289,870 | B2* | 3/2022 | Piccoli | G02F 1/35 |
| 2011/0002691 | A1* | 1/2011 | Lin | H01S 3/10023 |
| | | | | 398/118 |
| 2013/0188240 | A1* | 7/2013 | Shaw | G02F 1/365 |
| | | | | 359/326 |
| 2015/0023628 | A1 | 1/2015 | Fermann et al. | |
| 2015/0192768 | A1* | 7/2015 | Salem | G01N 21/47 |
| | | | | 250/227.2 |
| 2015/0288133 | A1* | 10/2015 | Salem | H01S 3/0092 |
| | | | | 359/326 |
| 2020/0064708 | A1 | 2/2020 | Diddams et al. | |

OTHER PUBLICATIONS

Butler, T. P., et al., "Watt-scale 50-MHz source of single-cycle waveform-stable pulses in the molecular fingerprint region", Optics Letters, Apr. 1, 2019, pp. 1730-1733, vol. 44, No. 7.

Timmers, H., et al., "Molecular fingerprinting with bright, broadband infrared frequency combs", Optica, Jun. 4, 2018, pp. 727-732, vol. 5, No. 6.

Vasilyev, S., et al., "Super-octave longwave mid-infrared coherent transients produced by optical rectification of few-cycle 2.5-μm pulses", Optica, Jan. 17, 2019, pp. 111-114, vol. 6, No. 1.

The extended European search report with European search opinion issued by the European Patent Office for European Patent Application No. 22154782.1, dated Jul. 22, 2022.

Abijith Kowligy et al., "Mid-infrared frequency combs at 10 GHz", May 26, 2020, pp. 1-8, Optical Society of America.

* cited by examiner

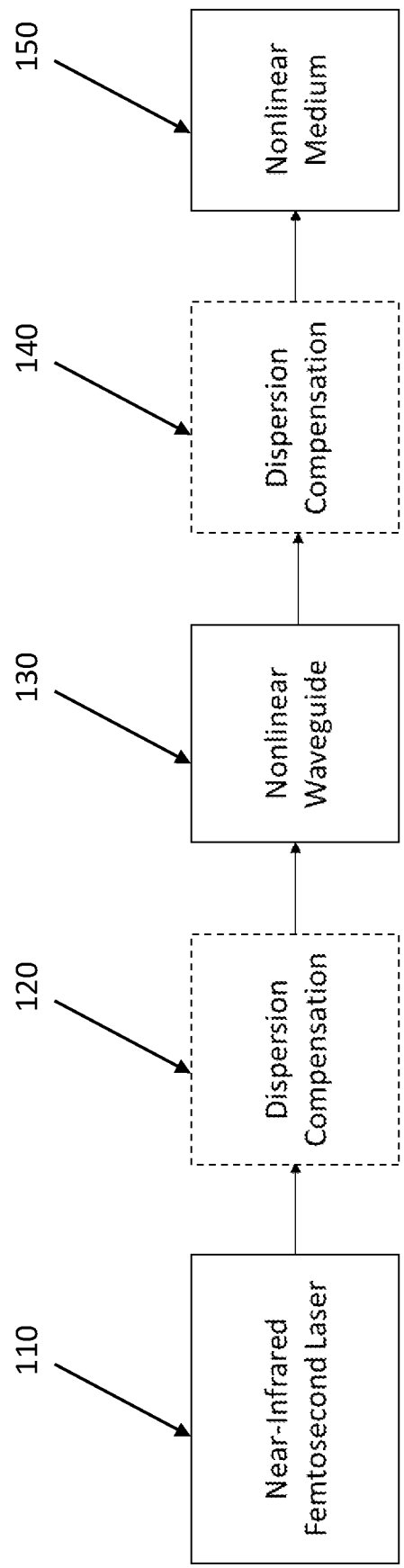

MID-INFRARED BROADBAND LASER USING CASCADED NONLINEARITIES IN MID-INFRARED FIBER AND NONLINEAR CRYSTAL

CROSS REFERENCE TO RELATED APPLICATIONS

This application claims the benefit of U.S. Provisional Patent Application No. 63/149,862 filed on Feb. 16, 2021. The contents of U.S. Provisional Patent Application 63/149,862 are hereby incorporated by reference.

FIELD OF THE INVENTION

This invention relates generally to broadband lasers, and more particularly to a mid-infrared broadband laser using cascaded nonlinearities in mid-infrared fiber and nonlinear crystal.

BACKGROUND

Broadband, high brightness mid-infrared sources are needed for a wide range of applications such as spectroscopy. Of particular interest is a source that can generate light between 3 μm and 15 μm wavelengths, covering a key segment of the mid-infrared region. Supercontinuum lasers operating in this range offer broadband light with high brightness. It is especially important to utilize a femtosecond architecture for supercontinuum generation in order to minimize spectral noise. Some supercontinuum generation technique using nonlinear fibers and waveguides requires a mid-infrared femtosecond pump source, which is not commercially available. Nonlinear difference frequency mixing has been demonstrated to generate broadband mid-infrared light using commercially available femtosecond lasers in the near-infrared, e.g., fiber laser systems operating in the 1 μm to 2 μm band. The conventional difference frequency generation method requires two pulses at two different wavelengths to mix inside a nonlinear crystal. This requirement adds to system complexity and makes the system susceptible to mechanical and environmental perturbations. An alternative based on intra-pulse difference frequency generation has been demonstrated that utilizes a very short pulse in the near-infrared. By mixing various frequency components within a short (few cycle) pulse, broadband mid-infrared light can be generated. The short pulses are typically generated by spectral broadening of a femtosecond pulse in a nonlinear waveguide or fiber. Previous demonstrations of this method have had one or both of the following shortcomings:

1. They are based on free-space lasers. Such lasers do not offer the compactness and robustness of fiber lasers.
2. They require the use of nonlinear crystals with transmission bands extending below 2-μm such that a pump laser with a center wavelength below 2-μm can be used. This limits the choice of nonlinear materials and does not allow the use of certain readily available crystals.

Therefore, there is a long-felt need for a broadband, high brightness mid-infrared source having a smaller footprint, less expensive, and more robust than existing systems, but does not have the above noted shortcomings.

SUMMARY

This document describes a system and a method for generating mid-infrared broadband light using self-phase modulation and intra-pulse different frequency generation. IP-DFG allows a system architecture with a smaller footprint, less expensive, and more robust than already commercially available difference frequency generation (DFG), optical parametric oscillator (OPO) or optical parametric amplifier (OPA) systems.

An embodiment of the present invention utilizes a fiber laser and a fiber for spectral broadening such that the spectrum of the pulse is extended beyond the 2-μm wavelength. This choice of wavelength region enables the use of crystals such as $ZnGeP_2$ (ZGP) and GaSe, which have high nonlinearity and are readily available with simple fabrication processes, but have high absorption at wavelengths shorter than 2-μm.

One embodiment of the present invention provides a mid-infrared broadband laser including: a femtosecond laser configured to generate a near-infrared light; a nonlinear waveguide (e.g., optical fiber, semiconductor waveguide, glass waveguide) configured to broaden and/or shift a spectrum of the light from the femtosecond laser; and a nonlinear medium (e.g., bulk crystal, quasi phase matched crystal, nonlinear waveguide made of patterned or poled, quasi phase matched nonlinear crystal) configured to generate a broadband light by mixing spectral components of the output from the non-linear waveguide.

One embodiment of the present invention provides a method of generating a mid-infrared broadband light including: generating a near-infrared light with a femtosecond laser; broadening and/or shifting a spectrum of the light from the laser with a nonlinear waveguide; and generating a broadband light by mixing spectral components of the output from the non-linear waveguide.

Optionally, at least one dispersion compensation element may be placed between the femtosecond laser and the nonlinear waveguide and/or between the nonlinear waveguide and the nonlinear medium according to an embodiment of the present invention.

BRIEF DESCRIPTION OF THE DRAWINGS

FIG. 1 is block diagram of a mid-infrared broadband laser according to an embodiment of the present invention.

DETAILED DESCRIPTION OF THE PREFERRED EMBODIMENTS

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A laser system according to an embodiment of the present invention is shown in FIG. 1. In one example embodiment of the present invention, the femtosecond laser 110 in the near-infrared outputs light in the 1 µm to 2.2 µm wavelength region. The near-infrared femtosecond laser can be based on, e.g., Yb-doped, Er-doped, Tm-doped, or Ho-doped fiber systems. A nonlinear waveguide 130 broadens and/or shifts the spectrum of the light. The nonlinear waveguide used for spectrum broadening can have any of the features: anomalous dispersion and near-IR transmission, normal dispersion and mid-IR transmission, anomalous dispersion and mid-IR transmission. In one example embodiment of the present invention, the nonlinear waveguide broadens and/or shifts the light from the near-infrared output of the femtosecond laser such that part of the output spectrum extends above 2 µm, ideally beyond 2.5 µm. In one example embodiment of the present invention, the nonlinear waveguide is an optical fiber made of a glass material with transmission at wavelengths extending above 2 µm, ideally above 2.5 µm. In one embodiment of the present invention, the nonlinear waveguide is a semiconductor waveguide. In one embodiment of the present invention, the nonlinear waveguide is a glass waveguide. In one example implementation, the nonlinear waveguide has a small (near-zero) anomalous dispersion at wavelengths longer than 2 µm, such that it allows self-compression and higher order soliton propagation for the portion of the light spectrum above 2 µm.

A nonlinear medium 150 is used to generate broadband light via intra-pulse difference frequency generation and/or other non-linear processes, such as but not limited to optical parametric amplification, or optical parametric generation. In one example embodiment of the present invention, the nonlinear medium generates broadband light at wavelengths longer than 3 µm and as long as 25 µm by mixing spectral components of the output from the non-linear waveguide.

The nonlinear medium can be made from: bulk crystals, quasi phase matched crystals, nonlinear waveguide made of patterned or poled, quasi phase matched nonlinear crystals, etc. For example, the nonlinear medium is a nonlinear waveguide made from orientation patterned gallium phosphide (OP-GaP).

In one embodiment of the present invention, at least one optional dispersion compensation element 120 is situated in between the output of the near-infrared femtosecond laser 110 and the input of the nonlinear waveguide 130. The dispersion compensation element compensates for the pulse broadening effects that occur in the laser system without introducing significant power losses. In one embodiment of the present invention, at least one optional dispersion compensation element 140 is situated in between the output of the broadening nonlinear waveguide 130 and the input of the nonlinear medium 150. The dispersion compensation in bulk MIR glass, such as ZnSe material or chirped mirrors, can be used to optimize the efficiency of the wavelength conversion process.

In one embodiment of the present invention, a nonlinear fiber with mid-infrared transmission, such as but not limited to fluoride fibers, is utilized to broaden the spectrum of a femtosecond fiber laser beyond the cut-off wavelength of silica glass (typically 2.3 µm to 2.5 µm). This expands the total output spectrum wavelength beyond 2.5 µm to and as long as 5.5 µm. This broadening of the wavelength above 2.5 µm is beneficial for using certain nonlinear crystals with a transmission window which does not start until above 2 µm. In addition, it pushes the short wavelength end of the supercontinuum further towards higher frequencies. Existing literatures in the art have only considered silica fibers for broadening, which limits the method to specific nonlinear crystals with short-wavelength transmission windows (see for example, Timmers et al., "Molecular fingerprinting with bright, broadband infrared frequency combs," Optica 5, pp. 727-732, 2018).

In one embodiment of the present invention, achromatic lenses or reflective optics are used for collimating light out of the nonlinear waveguide and for focusing light onto the nonlinear medium.

In one embodiment of the present invention, the femtosecond laser is a fiber laser and the nonlinear waveguide is a mid-infrared fiber, and the output fiber from the fiber laser is coupled to the input of the mid-infrared fiber using a fusion or mechanical splice between the two fibers.

A unique advantage of a method or system according to one embodiment of the present invention is that the method or system is not limited to the use of normal dispersion fiber for spectral broadening. Instead, a fiber with small (near-zero) anomalous dispersion can be used such that the system can operate in the self-compression regime. Existing literature clearly states the use of normal dispersion nonlinear fiber. In contrast, both normal and anomalous dispersion fibers can be used in a system according to an embodiment of the present invention.

The present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:
1. A mid-infrared broadband laser comprising:
a femtosecond laser configured to generate a near-infrared light;
a nonlinear waveguide configured for anomalous dispersion, and broadening and/or shifting a spectrum of the light from the femtosecond laser, and with mid-infrared transmission at wavelengths longer than 2 µm, such that self-compression and higher order soliton propagation occur for a portion of the light spectrum above 2 µm; and a nonlinear medium configured to generate a broadband light by mixing spectral components of the output from the nonlinear waveguide.

2. The mid-infrared broadband laser of claim 1, further comprising at least one dispersion compensation element situated in between the nonlinear waveguide and the nonlinear medium.

3. The mid-infrared broadband laser of claim 2, wherein the at least one dispersion compensation element is in bulk mid-infrared glass or at least one chirped mirror.

4. The mid-infrared broadband laser of claim 1, further comprising at least one dispersion compensation element situated in between the femtosecond laser and the nonlinear waveguide.

5. The mid-infrared broadband laser of claim 4, wherein the at least one dispersion compensation element is in bulk mid-infrared glass or at least one chirped mirror.

6. The mid-infrared broadband laser of claim 1, wherein the nonlinear waveguide is an optical fiber.

7. The mid-infrared broadband laser of claim 1, wherein the nonlinear waveguide is a semiconductor waveguide.

8. The mid-infrared broadband laser of claim 1, wherein the nonlinear waveguide is a glass waveguide.

9. The mid-infrared broadband laser of claim 1, wherein the nonlinear medium is a bulk crystal.

10. The mid-infrared broadband laser of claim 1, wherein the nonlinear medium is a quasi phase matched crystal.

11. The mid-infrared broadband laser of claim 1, wherein the nonlinear medium is a nonlinear waveguide made of patterned or poled, quasi phase matched nonlinear crystal.

12. The mid-infrared broadband laser of claim 1, wherein the mixing comprises one or more of the following processes: intra-pulse difference frequency generation, optical parametric amplification, or optical parametric generation.

13. The mid-infrared broadband laser of claim 1, wherein the femtosecond laser outputs light in the 1 μm to 2.2 μm wavelength region, the nonlinear waveguide broadens and/or shifts the light from the femtosecond laser such that part of the output spectrum extends above 2.5 μm, and the nonlinear medium generates broadband light at wavelengths longer than 3 μm.

14. The mid-infrared broadband laser of claim 1, wherein the infrared femtosecond laser is a Yb-doped, Er-doped, Tm-doped, or Ho-doped fiber-based system.

15. The mid-infrared broadband laser of claim 1, wherein the nonlinear medium has transmission for mid-infrared wavelengths above 2 μm.

16. The mid-infrared broadband laser of claim 1, wherein the nonlinear medium is a $ZnGeP_2$ or GaSe crystal.

17. A method of generating a mid-infrared broadband light comprising:
    generating a near-infrared light with a femtosecond laser;
    configuring a nonlinear waveguide for anomalous dispersion, and broadening and/or shifting a spectrum of the light from the femtosecond laser, and with mid-infrared transmission at wavelengths longer than 2 μm, such that self-compression and higher order soliton propagation occur for a portion of the light spectrum above 2 μm; and
    generating a broadband light with a nonlinear medium by mixing spectral components of the output from the nonlinear waveguide.

18. The method of claim 17, wherein the nonlinear medium has transmission for mid-infrared wavelengths above 2 μm.

* * * * *